Patented Feb. 5, 1924.

1,482,483

UNITED STATES PATENT OFFICE.

ARTHUR STANLEY QUICK, OF LONDON, ENGLAND.

PROCESS OF REFINING OILS.

No Drawing.   Application filed August 31, 1921.   Serial No. 497,454.

(GRANTED UNDER THE PROVISIONS OF THE ACT OF MARCH 3, 1921, 41 STAT. L., 1313.)

*To all whom it may concern:*

Be it known that I, ARTHUR STANLEY QUICK, a subject of the Kingdom of Great Britain, residing at London, Southwest, England, have invented certain new and useful Improvements in a Process of Refining Oils, for which I have made application in England, March 20, 1920, Patent No. 161,813; and I do hereby declare the following to be a full, clear, and exact description of the invention, such as will enable others skilled in the art to which it appertains to make and use the same.

This invention relates to the refining of animal or vegetable oils, and has for its object to provide an improved process of refining such oils.

The improved process consists in adding to the oil to be treated, heated or not, a proportion (say one half of quantity) of a material containing a radio-active constituent such as monazite sand and a quantity of water equal to that of the oil and stirring the mixture and then allowing the foots to separate out.

In treating linseed oil by the process I proceed as follows:

20 gallons commercial linseed oil are placed in a pan to which are added 20 gallons water and 10 lbs. of monazite sand. The contents of the pan are heated to about 120° F. and air is blown in to break against the bottom of the pan and ascend in bubbles from the sand through the water and the oil. I continue this treatment for about six hours, and then allow the oil to stand for another four hours when the foots etc., separate, leaving the oil clear, and in "non-breaking" condition. The water is then separated in known manner. The monazite sand can be used repeatedly.

In general a temperature of 120° F. may be used for most oils. The temperature employed may be slightly higher so long as the temperature is not raised sufficiently high to effect any deleterious chemical or physical change in the oil. A lower temperature may also be used, but with a lower temperature the stirring treatment will require to be continued for a longer period. For instance, if a temperature of 100° F. were employed the stirring treatment should be continued for between seven and eight hours.

As a result of experimental research I have ascertained that the refinement obtainable by my process is not obtainable by the substitution for monazite sand of oxides usually regarded as catalysts and that again such refinement is not obtainable by the use of organic absorbent such as fullers' earth. Hence I conclude that the refinement is effected by radio activity which within the range of temperatures contemplated and in the presence of water exercises a definite action on the foots without producing any chemical or physical change in the oil, as a result of which the foots separate of themselves when the mixture is allowed to settle.

I claim:—

1. A process of refining oil consisting in adding to the oil an equal quantity of water and about one half the quantity of monazite sand, heating the mixture, stirring the mixture, allowing the mixture to settle and then separating the oil.

2. A process of refining oil consisting in adding to every 20 gallons of the oil an equal quantity of water and 10 lbs. of monazite sand, heating the mixture to about 120° F. and stirring for approximately six hours, allowing to settle for four hours and then separating the oil in known manner.

In testimony whereof I have signed my name to this specification.

ARTHUR STANLEY QUICK.